United States Patent

Comte

[11] Patent Number: 5,525,554
[45] Date of Patent: Jun. 11, 1996

[54] HIGH INDEX GLASSES

[75] Inventor: Marie J. M. Comte, Fontenay aux Roses, France

[73] Assignee: Corning France, S.A., Avon Cedex, France

[21] Appl. No.: 480,988

[22] Filed: Jun. 7, 1995

[30] Foreign Application Priority Data

Mar. 7, 1995 [FR] France .................................. 95 02645

[51] Int. Cl.$^6$ .......................... C03C 3/095; C03C 3/097; C03C 4/00
[52] U.S. Cl. .................... 501/64; 501/63; 501/73; 501/903
[58] Field of Search .................... 501/63, 64, 73, 501/903

[56] References Cited

U.S. PATENT DOCUMENTS

| | | | |
|---|---|---|---|
| 4,055,435 | 10/1977 | Sagara | 501/64 |
| 4,149,895 | 4/1979 | Boudot et al. | 501/63 |
| 4,179,300 | 12/1979 | Sagara | 501/63 |
| 5,320,985 | 6/1994 | Enomoto | 501/903 |

Primary Examiner—Mark L. Bell
Assistant Examiner—Louis M. Troilo
Attorney, Agent, or Firm—Angela N. Nwaneri; Milton M. Peterson

[57] ABSTRACT

This invention is directed to the production of glasses essentially free of $Nb_2O_5$, and having refractive index close to 1.7, an Abbe number of about 35 and a density close to 3.2. The glasses consist essentially in weight percent on the oxide basis, of

| | |
|---|---|
| $SiO_2$ | 38–45 |
| $TiO_2$ | 15–<20 |
| $ZrO_2$ | 6–10 |
| $La_2O_3$ | 0.5–4 |
| $BaO$ | 12–19 |
| $CaO$ | 3–8 |
| $BaO + CaO + SrO$ | 17–25 |
| $Na_2O$ | 2–6 |
| $K_2O$ | 4–8 |
| $Li_2O + Na_2O + K_2O$ | 6–10.5 |

4 Claims, No Drawings

HIGH INDEX GLASSES

BACKGROUND OF THE INVENTION

The invention relates to glasses with a refractive index close to 1.7, an Abbe number close to 35 and a density close to 3.2.

Many glasses of varying compositions have been disclosed in the past having similar properties, particularly for use in optical and ophthalmic applications. However, these glasses have presented several disadvantages such as high batch cost, low viscosity at the liquidus temperature, low chemical durability and/or yellow coloration.

For example FR-2 427 309 describes glasses having the following compositions, expressed in terms of weight percent on the oxide basis:

| | |
|---|---|
| $SiO_2$ | 40–46 |
| $Al_2O_3$ | 0–3 |
| $SiO_2 + Al_2O_3$ | 40–46 |
| $TiO_2$ | 13–17 |
| $ZrO_2$ | 4–11 |
| $Nb_2O_5$ | 2–10 |
| BaO | 8–16 |
| SrO | 0–4 |
| CaO | 3–7 |
| MgO | 0–2 |
| BaO + CaO + SrO | 15–25 |
| CaO + MgO | 4–8 |
| $Li_2O$ | 0–3 |
| $Na_2O$ | 2–7 |
| $K_2O$ | 3–8 |
| $Li_2O + Na_2O + K_2O$ | 5–12. |

In addition to having a refractive index of about 1.7, an Abbe number of about 35, and a density in the region of 3.2, these glasses exhibit good resistance to acids and viscosities at the liquidus in excess of 22 Pa.s, which is advantageous for their production, allowing their direct molding. These properties make such glasses particularly suited for optic and ophthalmic applications. However, the high $Nb_2O_5$ content (2–10%) of the glass compositions make the cost of these glasses rather high.

Accordingly, it is the object of the present invention to provide low cost glasses having similar properties to those described above, and having high resistance to devitrification.

SUMMARY OF THE INVENTION

I have found that it is possible to decrease very significantly the level of $Nb_2O_5$ of the glasses described in FR-A-2 427 309, without any significant adverse effects on their properties. In particular, I have found that glass having similar properties can be obtained by replacing the $Nb_2O_5$ with $TiO_2$ and $La_2O_3$. In one experiment, glass composition in which the $Nb_2O_5$ has been thus replaced was shown to exhibit the following properties:

- a refractive index between 1.675 and 1.72,
- an Abbe number between 33 and 36.5,
- a viscosity at the liquidus higher than 22 Pa.s,
- a good chemical durability,
- a low coloration, and
- a density lower than 3.25.

Even though I have described above that it is possible to completely eliminate $Nb_2O_5$ from the inventive glass without any adverse effect on the desired glass properties, it will be clear to persons skilled in the art that if desired, a small amount of this oxide (up to 2%), may be added without altering the scope and intent of the invention. Thus, broadly defined, the inventive glass consists essentially, expressed in terms of weight percent on the oxide basis, of the following composition:

| | |
|---|---|
| $SiO_2$ | 38–45 |
| $TiO_2$ | 15–<20 |
| $ZrO_2$ | 6–10 |
| $La_2O_3$ | 0.5–4 |
| $Nb_2O_5$ | 0–<2 |
| BaO | 12–19 |
| SrO | 0–4 |
| CaO | 3–8 |
| BaO + CaO + SrO | 17–25 |
| $Li_2O$ | 0–3 |
| $Na_2O$ | 2–6 |
| $K_2O$ | 4–8 |
| $Li_2O + Na_2O + K_2O$ | 6–10.5 |
| $Al_2O_3$ | 0–3 |
| $B_2O_3$ | 0–3 |
| MgO | 0–3 |
| ZnO | 0–3 |
| $Al_2O_3 + B_2O_3 + MgO + ZnO$ | 0–12 |
| $As_2O_3 + Sb_2O_3 + F + Cl + Br$ | 0–2 |

DESCRIPTION OF THE PREFERRED EMBODIMENTS

As indicated above, glass having refractive index of about 1.7, and Abbe number of about 35 and a density of about 3.2 can be obtained by essentially eliminating $Nb_2O_5$ from the glass composition of the FR '309 patent. In particular, the use of $TiO_2$, $La_2O_3$ and $ZrO_2$ in the specified ranges produces glass having the required refractive index.

I have found that $TiO_2$ in excess of 20% increases the tendency of the glass to devitrify and decreases its viscosity at the liquidus temperature. Moreover beyond 20 wt % of this oxide, the glass will also tend to exhibit a yellow coloration. Above 4 wt % of $La_2O_3$ the density exceeds 3.25. The effect of $ZrO_2$ on the refractive index is similar to that reported for $La_2O_3$. However, beyond 10 wt % there is a tendency for the glass to devitrify.

In addition to contributing to an increase in the refractive index, the alkaline-earth metal oxides present the added advantage of having a very weak influence on dispersion. The combination of all alkaline earth metal oxides (i.e., BaO+CaO+SrO) is preferably, at least 17%. I have found that amounts above 25% wt % may lead to unacceptable devitrification. Among the alkaline-earth oxides, BaO is preferred because this oxide has the least tendency to devitrify.

Alkali metal oxides facilitate melting. Preferably, the combined amount of the alkali metal oxides (i.e., $Li_2O$+$Na_2O$+$K_2O$) is at least 6 wt. %. Beyond 10.5 wt % these oxides have a tendency to decrease the glass viscosity, especially the viscosity at the liquidus.

The glass can also contain small amounts (up to 3% each), of other oxides such as $Al_2O_3$, $B_2O_3$, MgO, and ZnO such that the combined amount of these oxides does not exceed 12 wt %. However, it is preferred that the glasses be essentially free from these oxides. In the most preferred embodiment, the combined amount of these oxides is no greater than 1%.

It is also possible and preferred to add the usual fining agents such as $As_2O_3$, $Sb_2O_3$ fluorides, chlorides, bromides, generally in such that the total amount of these agents is less than 2 wt % and preferably less than or equal to 1 wt %.

If relatively pure raw materials are used (for example leading to a maximum $Fe_2O_3$ content of 60 ppm), the glass is only very weakly colored. If further desired, decolorizing agents may be added. It is possible to color these glasses by adding the usual coloring agents such as for example, transition metal oxides or rare earth metal oxides.

The most preferred range of compositions is given below, and it describes the glasses displaying the lowest batch cost and the highest resistance to devitrification.

| | |
|---|---|
| $SiO_2$ | 39–43 |
| $TiO_2$ | 16–19 |
| $ZrO_2$ | 7–10 |
| $La_2O_3$ | 1–3 |
| $Nb_2O_5$ | 0–<1 |
| BaO | 14–18 |
| SrO | 0–2 |
| CaO | 4–6 |
| BaO + CaO + SrO | 19–24 |
| $Li_2O$ | 0 |
| $Na_2O$ | 2–5 |
| $K_2O$ | 4–8 |
| $Li_2O + Na_2O + K_2O$ | 7–10 |
| $Al_2O_3$ | 0–1 |
| $B_2O_3$ | 0–1 |
| MgO | 0–1 |
| ZnO | 0–1 |
| $Al_2O_3 + B_2O_3 + MgO + ZnO$ | 0–1 |
| $As_2O_3 + Sb_2O_3 + F + Cl + Br$ | 0–1. |

Tables 1 and 2 present a number of glass compositions and properties of the inventive glasses. The compositions are expressed in terms of weight fraction, but, because the sum of the components totals or closely approximates 100, for all practical purposes, the individual values can be deemed to reflect weight percent.

In each case 3000 grams of raw materials were melted for 2 hours at 1400° C. in a platinum crucible. Thereafter the molten glasses were formed into bars one centimeter thick and measurements performed on the annealed glasses. Whereas these examples reflect only laboratory experiments, the glasses of the invention can be manufactured in industrial plants utilizing classical glass melting and forming techniques.

The glass coloration was obtained by measuring the transmission at 400 nm of polished samples 10 mm thick. Chemical durability of the glasses was determined by carrying out hydrolytic resistance, acid durability, as well as alkali durability tests. In order to have a satisfactory durability, the level of $Na_2O$ analyzed after attack by water in the hydrolytic resistance test, must be less than 50 μg/g. The half-weight loss as measured by the acid durability test must be less than 120 mg/dm$^2$. Finally, the half-weight loss as measured by the alkali durability test, must be less than 30 mg/dm$^2$. High alkali metal oxides, high levels of $ZrO_2$ and SrO, as well as low levels of $K_2O$, tend to lower the viscosity at the liquidus below 22 Pa.s. When the $La_2O_3$ level exceeds 4 wt %, the density of the glass tends to rise to unacceptably high levels.

Based upon an overall balance of the desired glass properties and batch cost, Examples 1 and 2 are deemed to represent the best embodiment of the invention.

TABLE 1

| Example | 1 | 2 | 3 | 4 | 5 | 6 |
|---|---|---|---|---|---|---|
| $SiO_2$ | 40.75 | 40.75 | 40.45 | 40.45 | 41.45 | 40.75 |
| $TiO_2$ | 17.85 | 17.85 | 17.15 | 17.15 | 17.15 | 17 |
| $ZrO_2$ | 8.7 | 7.7 | 8.7 | 8.7 | 8.7 | 8.7 |
| $La_2O_3$ | 1.7 | 1.7 | 1.3 | 1.3 | 1.7 | 0.85 |
| $Nb_2O_5$ | 0 | 0 | 1.4 | 1.4 | 0 | 1.7 |
| BaO | 15.85 | 16.85 | 14.85 | 13.85 | 14.85 | 15.85 |
| SrO | 0.5 | 0.5 | 0.5 | 0.5 | 0.5 | 0.5 |
| CaO | 5.15 | 5.15 | 5.15 | 7.15 | 5.15 | 5.15 |
| BaO + SrO + CaO | 21.5 | 22.5 | 20.5 | 21.5. | 20.5 | 21.5 |
| $Li_2O$ | 0 | 0 | 1 | 0 | 1 | 0 |
| $Na_2O$ | 3.1 | 3.1 | 3.1 | 3.1 | 3.1 | 3.1 |
| $K_2O$ | 5.85 | 5.85 | 5.85 | 5.85 | 5.85 | 5.85 |
| $Li_2O + Na_2O + K_2O$ | 8.95 | 8.95 | 9.95 | 8.95 | 9.95 | 8.95 |
| F | 0.22 | 0.22 | 0.22 | 0.22 | 0.22 | 0.22 |
| $As_2O_3$ | 0.33 | 0.33 | 0.33 | 0.33 | 0.33 | 0.33 |
| Index | 1.702 | 1.699 | 1.705 | 1.7 | 1.699 | 1.7 |
| Abbe number | 34.5 | 34.9 | 34.6 | 34.5 | 35.2 | 34.7 |
| Density | 3.23 | 3.24 | 3.23 | | 3.18 | 3.22 |
| Transmission at 400 nm | 75.5 | 75.8 | | | | >75 |
| Temperature for a viscosity of: | | | | | | |
| 10 Pa · s | 1223 | 1217 | 1167 | | 1188 | |
| 100 Pa · s | 1084 | 1078 | 1034 | | 1047 | |
| Viscosity at the liquidus (Pa · s) | 35 | 30 | 22 | 25 | 25 | 40 |
| Durability: | | | | | | |
| DIN 12111 $Na_2O$ (μg/g) | 24.8 | | 32 | | | |
| DIN 12116 weight loss (mg/dm$_2$) | 27.2 | | 63 | | | |
| ISO 695 weight loss (mg/dm$_2$) | 14.5 | | 13.5 | | | |

TABLE 2

| Example | 7 | 8 | 9 | 10 | 11 | 12 |
|---|---|---|---|---|---|---|
| $SiO_2$ | 40.75 | 40.75 | 40.75 | 40.75 | 39.65 | 40.75 |
| $TiO_2$ | 16.15 | 18.15 | 17.85 | 17.85 | 16.15 | 17.85 |
| $ZrO_2$ | 8.7 | 8.7 | 8.7 | 8.7 | 8.7 | 10.4 |
| $La_2O_3$ | 0 | 0 | 1.7 | 1.7 | 4.5 | 0 |
| $Nb_2O_3$ | 3.4 | 1.4 | 0 | 0 | 0 | 0 |
| BaO | 15.85 | 11.85 | 14.85 | 10.9 | 15.85 | 15.85 |
| SrO | 0.5 | 0.5 | 0.5 | 4.45 | 0.5 | 0.5 |
| CaO | 5.15 | 5.15 | 5.15 | 5.15 | 5.15 | 5.15 |
| BaO + SrO + CaO | 21.5 | 17.5 | 20.5 | 20.5 | 21.5 | 21.65 |
| $Li_2O$ | 0 | 4 | 1 | 1 | 0 | 0 |
| $Na_2O$ | 3.1 | 3.1 | 5.85 | 3.1 | 3.1 | 3.1 |
| $K_2O$ | 5.85 | 5.85 | 3.1 | 5.85 | 5.85 | 5.85 |
| $Li_2O + Na_2O + K_2O$ | 8.95 | 12.95 | 9.95 | 9.95 | 8.95 | 9 |
| F | 0.22 | 0.22 | 0.22 | 0.22 | 0.22 | 0.22 |
| $As_2O_3$ | 0.33 | 0.33 | 0.33 | 0.33 | 0.33 | 0.33 |
| Index | 1.7 | 1.707 | | | 1.701 | 1.703 |
| Abbe number | 34.6 | 34.5 | | | 35.5 | 34.3 |
| Density | 3.22 | 3.14 | 3.24 | 3.22 | 3.29 | 3.22 |
| Transmission at 400 nm | 75 | | | | | |
| Temperature for a viscosity of: | | | | | | |
| 10 Pa · s | 1230 | 1053 | 1144 | 1155 | | |
| 100 Pa · s | 1091 | 932 | 1027 | 1039 | | |
| Viscosity at the liquidus (Pa · s) | 40 | 5 | 10–16 | 11–16 | | <16 |
| Durability: | | | | | | |
| DIN 12111 $Na_2O$ (μg/g) | 35 | | | | | |
| DIN 12116 weight loss (mg/dm$_2$) | 37.3 | | | | | |
| ISO 695 | 16.6 | | | | | |

TABLE 2-continued

| Example | 7 | 8 | 9 | 10 | 11 | 12 |
|---|---|---|---|---|---|---|
| weight loss (mg/dm$_2$) | | | | | | |

I claim:

1. Glass having a refractive index between 1.675 and 1.72 an Abbe number between 33 and 36.5 a viscosity at the liquidus higher than 22 Pa.s a good chemical durability a low coloration and a density lower than 3.25 and which consists essentially, expressed in terms of weight percent on the oxide basis, of

| | |
|---|---|
| $SiO_2$ | 38–45 |
| $TiO_2$ | 15–<20 |
| $ZrO_2$ | 6–10 |
| $La_2O_3$ | 0.5–4 |
| BaO | 12–19 |
| CaO | 3–8 |
| BaO + CaO + SrO | 17–25 |
| $Na_2O$ | 2–6 |
| $K_2O$ | 4–8 |
| $Li_2O + Na_2O + K_2O$ | 6–10.5 |
| $Nb_2O_5$ | 0–<2. |

2. Glass having a refractive index between 1.675 and 1.72 an Abbe number between 33 and 36.5 a viscosity at the liquidus higher than 22 Pa.s a good chemical durability a low coloration and a density lower than 3.25 and which consists essentially, expressed in terms of weight percent on the oxide basis, of

| | |
|---|---|
| $SiO_2$ | 38–45 |
| $TiO_2$ | 15–<20 |
| $ZrO_2$ | 6–10 |
| $La_2O_3$ | 0.5–4 |
| $Nb_2O_5$ | 0–<2 |
| BaO | 12–19 |
| SrO | 0–4 |
| CaO | 3–8 |
| BaO + CaO + SrO | 17–25 |
| $Li_2O$ | 0–3 |
| $Na_2O$ | 2–6 |
| $K_2O$ | 4–8 |
| $Li_2O + Na_2O + K_2O$ | 6–10.5 |
| $Al_2O_3$ | 0–3 |
| $B_2O_3$ | 0–3 |
| MgO | 0–3 |
| ZnO | 0–3 |
| $Al_2O_3 + B_2O_3 + MgO + ZnO$ | 0–12 |
| $As_2O_3 + Sb_2O_3 + F + Cl + Br$ | 0–2. |

3. Glass according to claim 2, consisting essentially, expressed in terms of weight percent on the oxide basis, of

| | |
|---|---|
| $SiO_2$ | 39–43 |
| $TiO_2$ | 16–19 |
| $ZrO_2$ | 7–10 |
| $La_2O_3$ | 1–3 |
| $Nb_2O_5$ | 0–<1 |
| BaO | 14–18 |
| SrO | 0–2 |
| CaO | 4–6 |
| BaO + CaO + SrO | 19–24 |
| $Li_2O$ | 0 |
| $Na_2O$ | 2–5 |
| $K_2O$ | 4–8 |
| $Li_2O + Na_2O + K_2O$ | 7–10 |
| $Al_2O_3$ | 0–1 |
| $B_2O_3$ | 0–1 |
| MgO | 0–1 |
| ZnO | 0–1 |
| $Al_2O_3 + B_2O_3 + MgO + ZnO$ | 0–1 |
| $As_2O_3 + Sb_2O_3 + F + Cl + Br$ | 0–1. |

4. A glass according to claim 1 that is essentially free of niobium oxide.

* * * * *